US007365454B2

(12) United States Patent
Morrow

(10) Patent No.: US 7,365,454 B2
(45) Date of Patent: Apr. 29, 2008

(54) ENHANCED POWER SWITCH DEVICE ENABLING MODULAR USB PC CARDS

(75) Inventor: Neil Morrow, San Jose, CA (US)

(73) Assignee: O2Micro International Limited, Georgetown, Grand Cayman (KY)

( * ) Notice: Subject to any disclaimer, the term of this patent is extended or adjusted under 35 U.S.C. 154(b) by 415 days.

(21) Appl. No.: 10/420,262

(22) Filed: Apr. 22, 2003

(65) Prior Publication Data
US 2004/0156151 A1 Aug. 12, 2004

Related U.S. Application Data

(60) Provisional application No. 60/446,589, filed on Feb. 11, 2003.

(51) Int. Cl.
*H01H 3/26* (2006.01)
(52) U.S. Cl. .......................... 307/140; 710/8; 710/301; 710/302
(58) Field of Classification Search ................ 710/301, 710/302, 8; 307/140
See application file for complete search history.

(56) References Cited

U.S. PATENT DOCUMENTS

| 5,613,130 | A | * | 3/1997 | Teng et al. .................. 713/300 |
| 5,884,086 | A |   | 3/1999 | Amoni et al. .......... 395/750.01 |
| 5,930,496 | A |   | 7/1999 | MacLaren et al. ............ 395/500 |
| 6,148,347 | A | * | 11/2000 | Finch et al. ................... 710/14 |
| 6,183,307 | B1 | * | 2/2001 | Laity et al. ................. 439/676 |
| 6,470,284 | B1 |   | 10/2002 | Oh et al. ....................... 702/64 |
| 6,549,967 | B1 | * | 4/2003 | McTague ..................... 710/302 |
| 6,684,283 | B1 | * | 1/2004 | Harris et al. ................. 710/302 |
| 6,718,274 | B2 | * | 4/2004 | Huang et al. .................. 702/64 |
| 6,807,597 | B2 | * | 10/2004 | Oh et al. ..................... 710/301 |
| 7,069,369 | B2 | * | 6/2006 | Chou et al. ................. 710/301 |
| 2001/0021956 | A1 | * | 9/2001 | Okamoto et al. ........... 710/102 |
| 2003/0172263 | A1 | * | 9/2003 | Liu ............................. 713/156 |
| 2004/0059860 | A1 | * | 3/2004 | Liu et al. ..................... 710/313 |

(Continued)

FOREIGN PATENT DOCUMENTS

EP 0841 608 A2 5/1998

(Continued)

OTHER PUBLICATIONS

Author unknown, Windows XP Professional Security, "Chapter 5: Operating System Enhancements", date unknown, pp. 111-136.

(Continued)

*Primary Examiner*—Michael Sherry
*Assistant Examiner*—Daniel Cavallari
(74) *Attorney, Agent, or Firm*—Grossman, Tucker, Perreault & Pfleger, PLLC

(57) ABSTRACT

An enhanced power switch device is provided for enabling modular USB PC cards. The enhanced power switch may include a card sense circuit for sensing the type of card present, a card power switching circuit for supplying power to a modular USB card, and isolation circuit for isolating conventional PC Card control signals from the modular USB card and a connection circuit for connecting USB signals to the USB Card. The system of the present invention can modified for other bus technologies, in addition to USB bus devices.

12 Claims, 7 Drawing Sheets

U.S. PATENT DOCUMENTS

2005/0066102 A1* 3/2005 Yamamoto et al. ......... 710/301

FOREIGN PATENT DOCUMENTS

EP 1074 918 A2 2/2001

OTHER PUBLICATIONS

ISO/IEC, International Standard, Identification cards—Integrated circuit(s) cards with contacts—"Part 10: Electronic signals and answer to reset for synchronous cards", First edition Nov. 1, 1999, pp. 1-8.

ISO/IEC, International Standard, Information technology—Identification cards—Integrated circuit(s) cards with contacts—"Part 3: Electronic signals and transmission protocols", Second edition Dec. 15, 1997, pp. 1-27.

Personal Computer Memory Card International Association and Japan Electronics and Information Technology Industries Association (PCMCIA/JEITA), "PC Card Standard", Release 8.1, Dec. 2002, pp. 1-34.

Personal Computer Memory Card International Association and Japan Electronics and Information Technology Industries Association (PCMCIA/JEITA), "PC Card Standard", vol. 3: Physical Specification, 2002, pp. 1-71.

English translation of Taiwan Office Action dated Jan. 25, 2006, "Preliminary Notice of Rejection of the IPO" from related Taiwan application (2 pgs).

* cited by examiner

ENHANCED POWER SWITCH DEVICE ENABLING MODULAR USB PC CARDS

This application claims priority under 35 USC § 119(e) to Provisional Application Ser. No. 60/446,589, filed Feb. 11, 2003 the teachings of which are hereby incorporated by reference in their entirety.

FIELD OF INVENTION

This invention relates to the design and manufacturing of PC Card controllers, PC Card power switches, and other circuitry required to connect a PC Card to a computer system.

BACKGROUND OF THE INVENTION

PC Cards, also called PCMCIA cards, allow an exchangeable method for users to interface various functions such as modems and data storage to a computer system. The PC Card Standard publishes specifications for the form factor, power requirements, electrical interfaces, etc. of these cards to ensure interoperability between many computer system manufacturers. By complying with the PC Card Standard, a computer system manufacturer can enable these modular functions on their machine via PC Card connectivity.

When a PC Card is inserted into the PC Card connector, the connection is detected by the PC Card controller by means of card detect and voltage sense signals, also called CD/VS signals. The CD/VS signals indicate the electrical interface and voltage requirements of the PC Card. The PC Card controller enables the appropriate electrical interface to the card, and communicates via electrical control signals to the PC Card Power Switch indicating the voltage requirements of the card. The PC Card Power Switch switches VCC and VPP power, as specified in the PC Card Standard, to the PC Card based on the control signals. Depending upon the function of the PC Card, an interface port or connector specific to the card application (e.g. antenna or phone jack) may be required to fully utilize the PC Card.

Traditional PC Card host electrical interfaces are either a 16-bit bus interface similar to the ISA protocol or a 32-bit bus interface similar to the PCI protocol. Often the 16-bit interface is called the "R2" protocol, and the 32-bit bus interface is named "CardBus". The PC Card controller typically connects to an electrical input/output bus interface to provide the connection to the system CPU and other core elements of the computer system.

The advantage of R2 and CardBus as electrical interfaces for PC Cards is that several end user applications utilize these electrical interfaces to provide add-on functions to computer system in several form factors. Porting the existing user applications to the PC Card form factor leverages from this, and generally requires only simple form factor and configuration changes. Typically the chip and software components required for the application are shared for PC add-in slot and PC Card form factor implementations.

There have been several advances in serial bus technology that are gaining popularity over use of ISA and PCI bus protocols. The most popular of these serial bus technologies is the Universal Serial Bus (USB). The USB bus interface is already in it's second generation, with USB Version 2.0 providing 400+ million bits per second throughput. The USB bus has gained such vast popularity, that it has expanded from it's adoption in personal computer systems to consumer electronics such as camcorders, digital cameras, digital music players, etc.

Although there has been an attempt to standardize the USB electrical interface in the PC Card Standard, defined in PC Card Standard 8.0, no implementations of this standard exist today. The standard focuses on the card interface, and does not solved technical problems with providing the USB electrical interface to the PC Card on the system at a cost point acceptable to the computer system manufacturers.

There are a large number of USB products and applications that exist on the market today, and the bandwidth for USB has increased 40× with the introduction of USB 2.0, illustrating the scalability of the USB serial bus. Thus, the desire to port existing USB user functions and applications to the PC Card form factor continues to increase, and computer system manufacturers are looking for a cost effective solution of enabling these modular USB functions in the PC Card form factor.

A MODULAR USB PC CARD

A modular USB PC Card is an apparatus that utilizes the PC Card form factor to physically connect to a computer system, whereupon a USB electrical connection is made to utilize the card application.

PC Card Standard 8.0 provides a method for detecting a card with a new electrical interface, although other methods may also be used such as that invented in U.S. Pat. No. 6,470,284. In either case, a combination of the CD/VS signals, and possibly other PC Card signals, can be used to identify the electrical interface of a PC Card.

A modular USB PC Card may require power from the computer system to operate. Typically, PC Cards are supplied power by a PC Card power switch device. The prior-art PC Card power switch is controlled by the PC Card controller, which senses the electrical interface and voltage requirements of the PC Card before controlling the PC Card power switch device.

A computer system manufacturer may be concerned that a modular USB PC Card may be inserted into a system that does not support it. This concern may be addressed by keying the USB PC Cards, or the USB PC Card "carrier". Keying presents a design of a new key to prevent the USB PC Cards from being inserted into an existing prior-art slot that does not support the USB PC Card. This will alert the end user that the card will not function in older systems.

FIG. 1 illustrates a typical prior-art PC Card subsystem in a computer system (102). When a PC Card (106) is inserted into the PC Card connector (105), the connection is detected by the PC Card controller (100) by means of card detect and voltage sense signals (107), also called CD/VS signals. The CD/VS signals indicate the electrical interface (111) and voltage requirements of the PC Card (106). The PC Card controller (100) enables the appropriate electrical interface to the card, and communicates via electrical control signals (103) to the PC Card Power Switch (104) indicating the voltage requirements of the card. The PC Card controller (100) typically interfaces to a PCI Bus (101) to provide the connection to the system CPU and other core elements of the computer system. The PC Card Power Switch (104) switches VCC and VPP power (109), as specified in the PC Card Standard, to the PC Card (106) based on the control signals (103). Depending upon the function of the PC Card, an interface port or connector (110) specific to the card application (e.g. antenna or phone jack) may be required to fully utilize the PC Card.

FIG. 2 illustrates two variations of a modular USB PC Card. The first variation (200) is a modular USB device in the PC Card form factor. The electrical interface (202) is the USB electrical interface. The second variation (201) is a modular USB device in form factor smaller than the PC Card form factor that requires a physical adapter (203), also called a "carrier", to interface to the PC Card socket. Depending upon the function of the USB PC Cards, an interface port or connector (110) specific to the card application (e.g. antenna or phone jack) may be required to fully utilize the modular USB PC Card.

FIG. 6 illustrates a typical functional diagram of a prior-art single socket PC Card power switch (104). The number labels 1-16 identify terminal numbers for the industry de-factor standard power switch package. The PC Card controller and other system components utilizes terminals 15, 14, 1, 2, and 8 as control signals (103) that switch VCC/NVPP power (109) to the PC Card socket. VCC is supplied through terminals 13, 12, and 11. VPP is supplied through terminal 10. The single socket power switch consists of several switches (S1-S6) that open and close per the control (103) to provide power options of 3.3V (input at terminals 3 and 4), 5V (input at terminals 5 and 6), and 12V (input at terminal 9) to the VCC/NVPP power output. There is typically current sensing circuitry to limit current for electrical protection; labeled "CS" blocks in FIG. 6. In some cases, there is also thermal sensor technology, labeled "Thermal" in FIG. 6, that protects the power switch from overheat conditions. The switches S1-S6 are typically implemented as large FETs with low impedance for high current throughput.

SUMMARY OF THE INVENTION

In one aspect, the present invention provides a PC Card power switch for operating enhanced PC Cards that includes a card sense circuit adapted to detect the type of PC Card using preselected PC Card signals and for generating a signal that is active when an enhanced PC Card is present.

In another aspect, the present invention provides a PC Card power switch for operating enhanced PC Cards that includes card sense circuitry adapted to detect the type of PC Card using preselected PC Card signals and for generating a signal that is active when an enhanced PC Card is present, and a connection circuit adapted to connect enhanced bus signal lines to the enhanced PC Card when the signal indicates the presence of an enhanced PC Card.

In any of the embodiments of the present invention, the enhanced PC Card may be selected from the group of cards that utilize an bus interface consisting of a USB bus, an IEEE1394 bus, a PCI-Express bus, an InfiniBand bus, and a Secure Digital Input/Output SDIO bus, and/or other bus technologies.

In a system aspect, the present invention provides a PC Card controller system for controlling conventional PC cards and enhanced PC cards. The system includes a PC Card controller adapted to generate conventional PC Card signals and control conventional PC Cards. The system also includes a power switch device adapted to determine if an enhanced PC Card is present.

The following Detailed Description will proceed with reference being made to preferred embodiments and methods of use, the present invention is not intended to be limited to these preferred embodiments and methods of use. Rather, the present invention is of broad scope and is intended to be limited as set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

The present invention provides a card detection power switch that is operable to control "enhanced" PC cards. "Conventional" PC Card controllers, as may be defined in the PC Card Standard 8.0, is used herein to mean controllers operable to detect and operate CardBus and PCMCIA type cards. Enhanced PC Cards, as used herein, means PC Cards adapted to operate on newer bus interfaces, for example, bus interfaces that comply or are compatible with Universal Serial Bus Specification Revision 2.0, published Apr. 27, 2000, available from the USC Implementers Forum, Inc. (hereinafter "USB"), IEEE Standard 1394-1995 IEEE Standard for High Performance Serial Bus (herein after"IEEE1394 bus"), PCI-Express Peripheral Component Interconnect (PCI) Express™ Base Specification Revision 1.0, published Jul. 22, 2002, available from the PCI Special Interest Group, Portland, Oreg., U.S.A. (hereinafter "PCI Express™ bus"), InfiniBand™ Architecture Specification Release 1.2, published Oct. 5, 2004, available from the InfiniBand® Trade Association (hereinafter "InfiniBand"), SD Card Specification, Simplified Version of Part E1, Version 1.00, published October 2001, available from SD Association (herein after "Secure Digital Input/Output SDIO cards"), and other bus interface technology.

Figure 1:
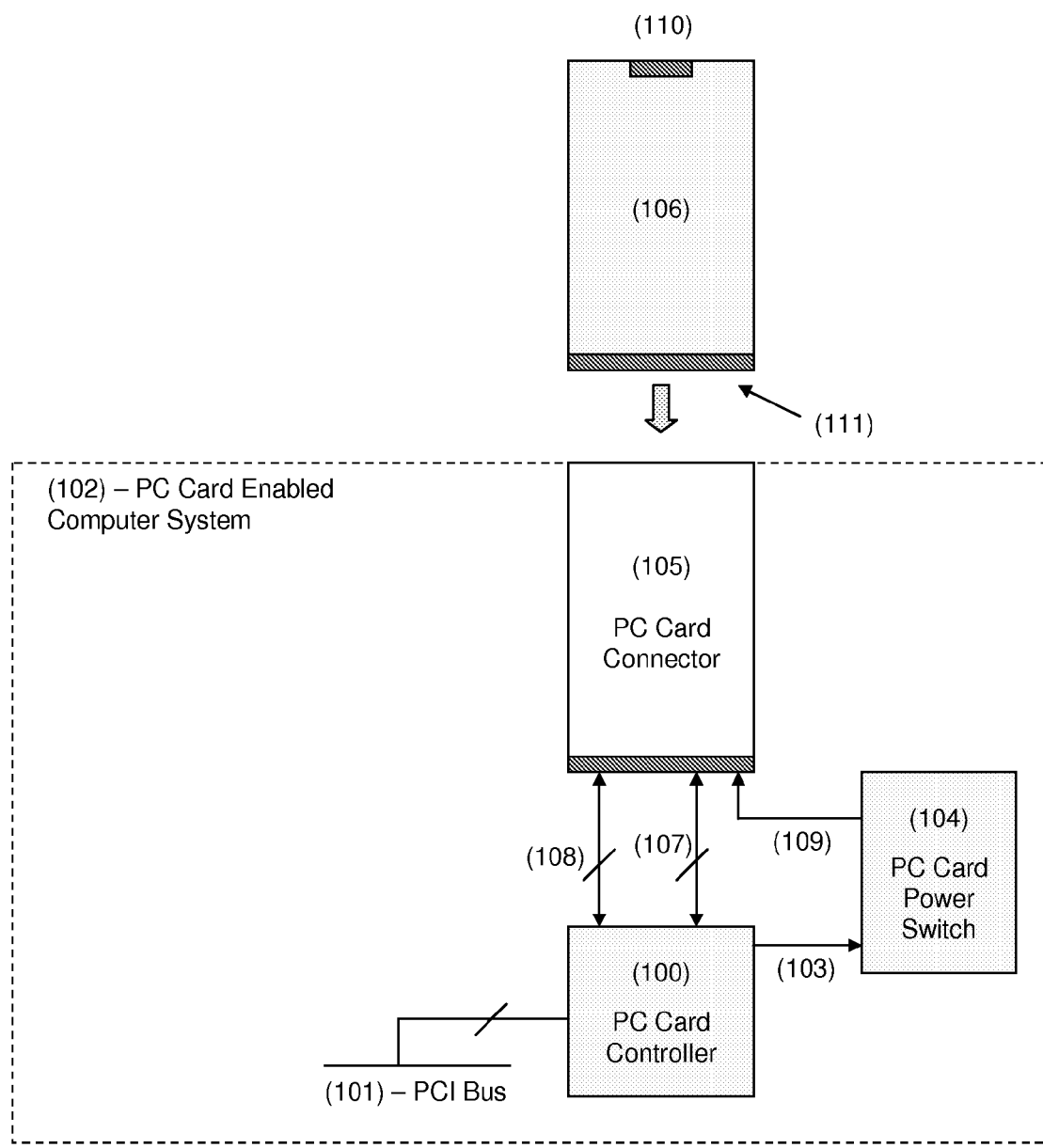
FIG. 1 illustrates a typical prior-art PC Card subsystem in a computer system.
Figure 2:
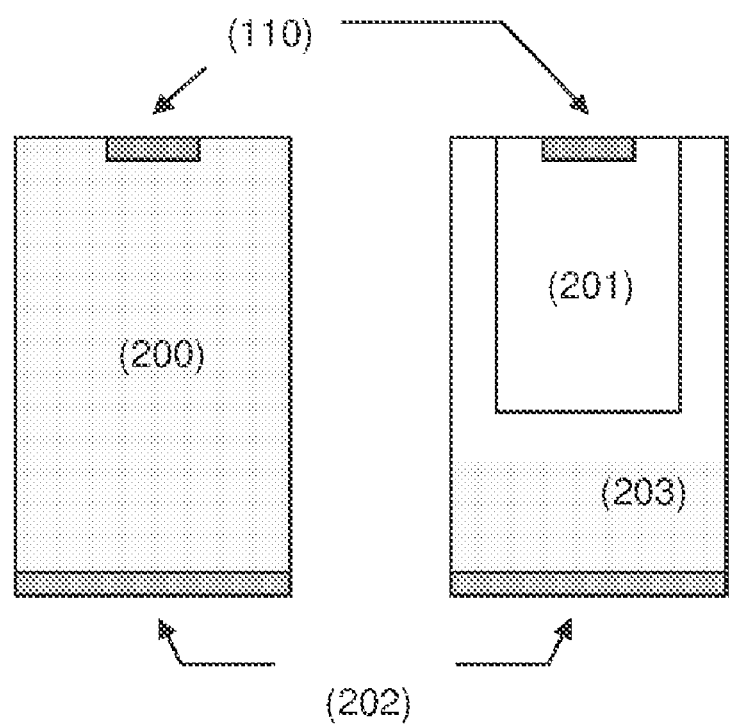
FIG. 2 illustrates two modular USB PC Cards: the first is a modular device in the PC Card form factor, the second is a modular device in a smaller form factor that requires a physical adapter (also called a "carrier") to interface to the PC Card socket.

The present invention provides a PC Card detection controller that may include enhanced power switch device that enables the enhanced PC Cards (FIG. 2). The following detailed description will make specific reference to USB enhanced PC Cards, however, this is only intended as an exemplary implementation and the present invention is intended to encompass any bus interface technology.

Figure 3:
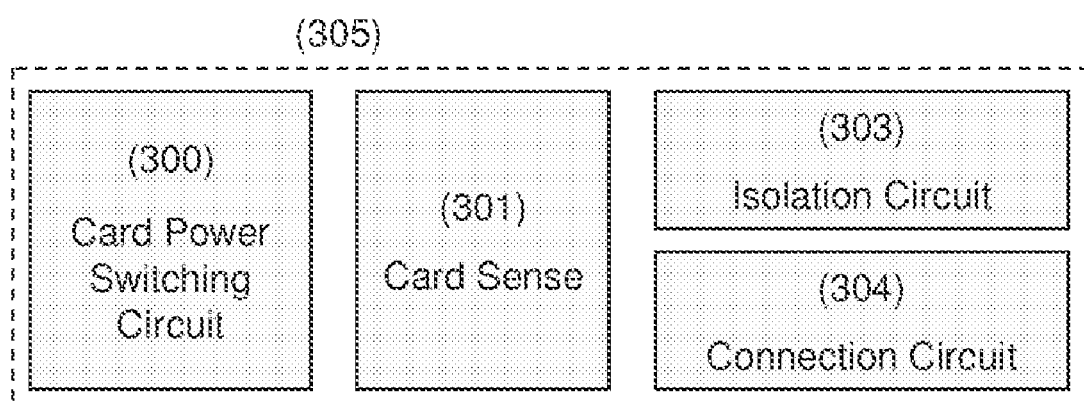
FIG. 3 illustrates a block diagram of the enhanced power switch of modular USB PC card of the present invention.

The enhanced power switch can be implemented in four sub-blocks in the PC Card power switch design, conceptually illustrated in FIG. 3. The enhanced power switch device (305) has four sub-blocks: Card Sense (301), Card Power Switching Circuit (300), Isolation Circuit (303), and Connection Circuit (304).

Figure 4:
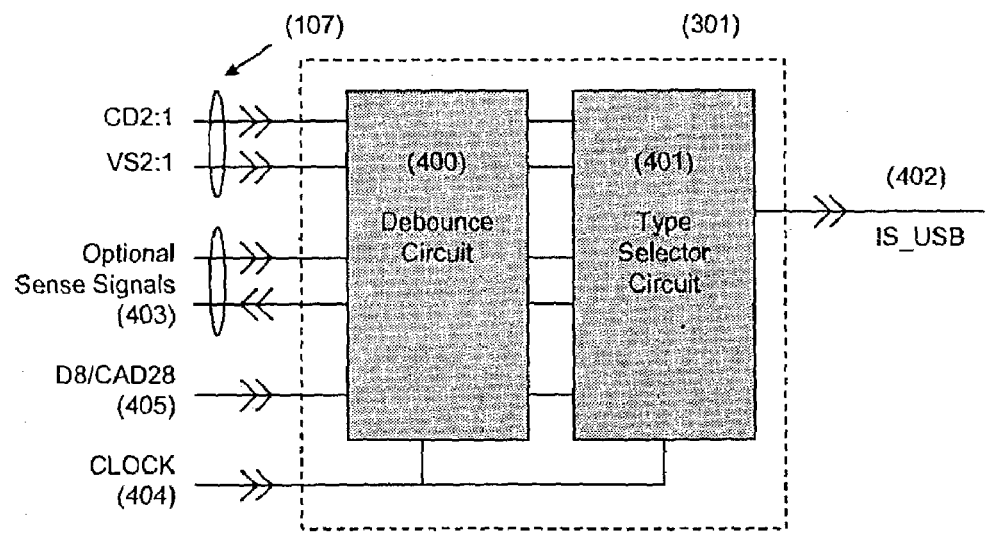
FIG. 4 illustrates the enhanced power switch card sense block circuitry of the present invention.

FIG. 4 illustrates the circuitry to detect the USB PC Cards in the card sense block (301). The card type detection is done by using the card detect and voltage sense signals (107), CD2:1 and VS2:1, defined in the PC Card Standard, as is well understood in the art and incorporated by reference herein. Other signals (403) may be used, for example the CSTSCHG# signal as set forth in the PC Card Standard. The methodology to detect PC Cards using this signal is described in U.S. Pat. No. 6,470,284, hereby incorporated by reference, and this signal may be also used to detect the presence of the USB expansion card. The card sense block (301) includes debounce circuitry (400) that assures stable electrical levels on the CD/VS connections to prevent mistaken card insertions and removals due to connection bounce on these inputs from the PC Card connector. Once the CD/VS levels, and any optional sense signals (403), are stable, the type selector circuit (401) determines the type of card, and asserts a new signal called IS_-USB (402) that is activated when a modular USB PC Card is inserted into the PC Card socket. A clock source (404) is used to time the debounce circuit and clock the logic in the type selector circuit (401).

In one exemplary embodiment, the modular USB PC Card type is determined positively when debounced CD2 and VS2 are at a logic level low, or ground level, and the CD1 card detect signal is connected to the VS1 voltage sense signal on the PC Card. This determination may be done by asserting VS1 to both logic level high and low, and sampling the CD1 input as following this assertion.

Figure 5:
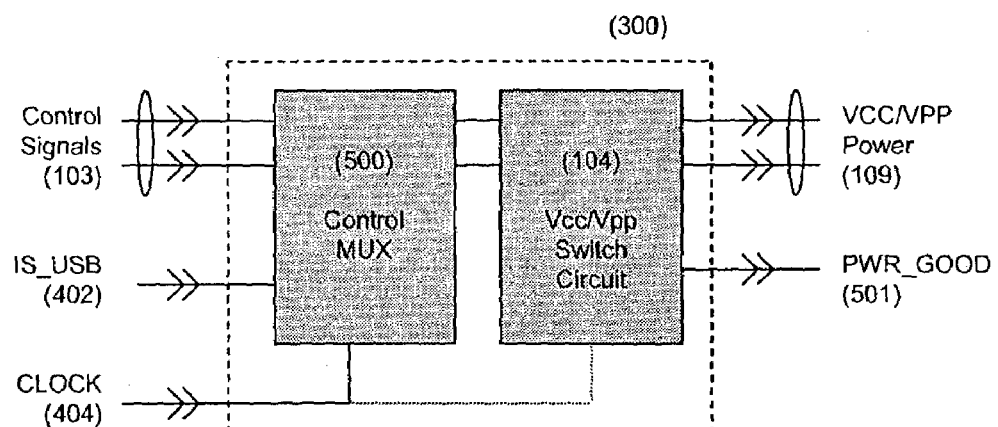
FIG. 5 illustrates the enhanced power switch power switching circuitry of the present invention.
Figure 6:
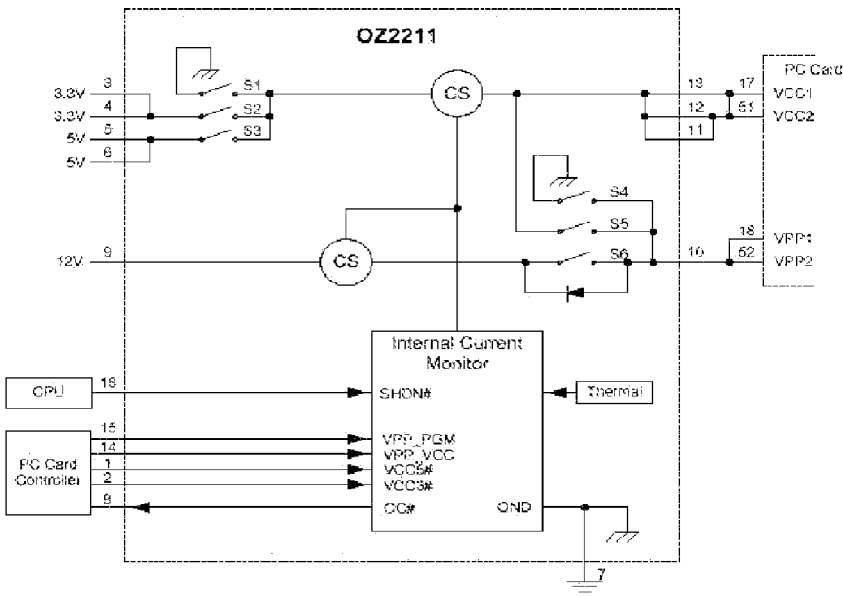
FIG. 6 illustrates a typical functional diagram of a prior-art single socket PC Card power switch.

FIG. 5 illustrates the circuitry in the card power switching circuit block (300) of the present invention. In the exemplary embodiment, the card power switching circuit (300) utilizes the IS_USB signal (402) from the card sense block (301) to control power to the PC Card socket, and thus to control power to the card. The conventional circuitry to switch VCC/VPP power (109) to the PC Card socket is labeled Vcc/Vpp Switch Circuit (104) in FIG. 5, and is further described in FIG. 6, which illustrates the conventional PC Card power switch approach in more detail. The control MUX (500) of the present invention uses the IS_USB signal (402) to select either the control signals (103) from the conventional PC Card controller or a new power mode for modular USB PC Cards. A clock source (404) may be used for this logic, and may used by the Vcc/Vpp Switch Circuitry (104), for example, required by the conventional dual socket PC Card power switches with a serial control protocol. This embodiment of the card power switching circuit (500) may generate a signal (501) that indicates when the power supplied to the PC Card socket is at a good level and ready for use, called PWR_GOOD. The exemplary embodiment uses a timer to determine when the power level is good, utilizing the clock source (404) to time this event.

Figure 7:
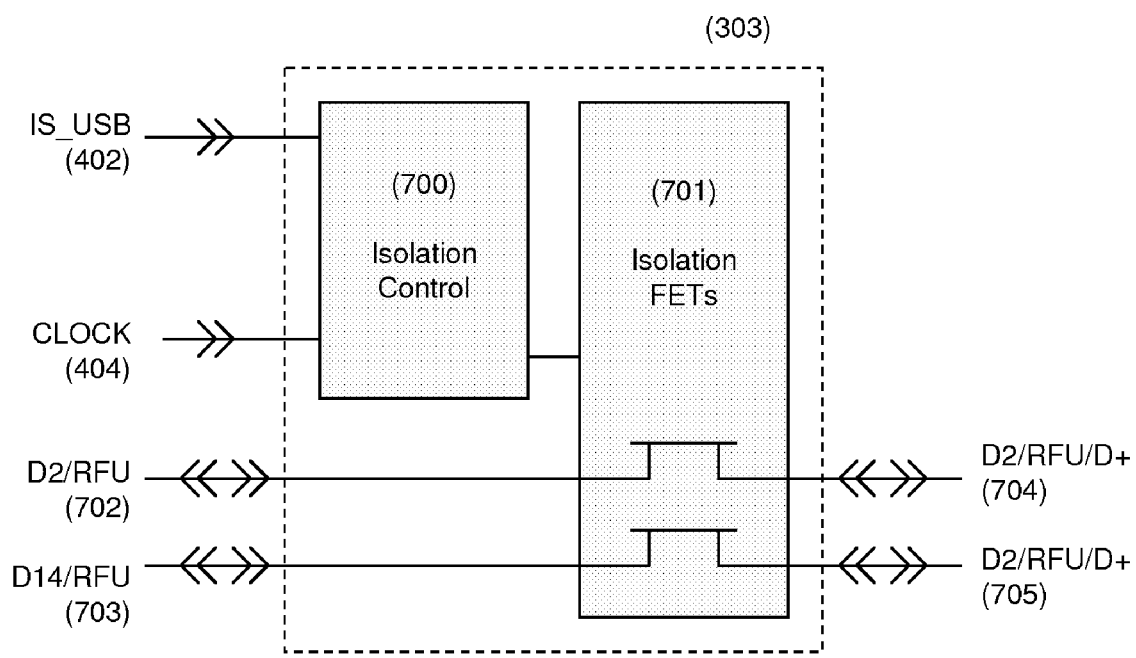
FIG. 7 illustrates the enhanced power switch isolation block circuitry of the present invention.

The isolation circuit block (303) of the present invention is illustrated in FIG. 7, and generally includes the function of electrically isolating the PC Card controller (100) signals D2/RFU (702) and D14/RFU (703) from the PC Card socket when the modular USB PC Card is inserted. This embodiment maps the USB D+ (704) and USB D− (705) signals on the USB PC Card electrical interface to the prior-art D2/RFU (702) and D14/RFU (703) connector signals. In FIG. 7, the USB signals D+ and D− are labeled D2/RFU/D+ and D14/RFU/D− because on the PC Card connector interface, one pin is used to support the electrical signaling for R2, CardBus, and USB.

This embodiment has an advantage by utilizing signals that are reserved for future use (i.e. RFU) in CardBus type PC Card applications. Future use generally means that a particular signal line is not assigned by the PC Card specification, but is reserved. CardBus PC Card protocols typically operate at a frequency of 33 MHz, much higher than the R2 data (e.g. including R2 and D14) signals. Higher switching frequency may place tight switch delay design constraints on the isolation FETs that may make them more expensive to manufacture.

In practical implementations of PC Card systems, the power supplied to the PC Card socket is typically supplied to the PC Card controller's electrical interface and to the PC Card socket. When the modular USB PC Card is powered, the PC Card controller may assert the D2/RFU (702) and D14/RFU (703) signals, causing contention with the USB PC Card electrical signals. A field effect transistor (FET) switch isolation circuit (701) may be included, and isolation is enabled when the isolation state is determined by the isolation control circuitry (700). In this embodiment, the isolation state is determined by the circuitry (700) when the IS_USB signal (402) has been asserted for a time period greater than 2 ms, of course this time period is also only exemplary and may be generally be defined as a state when the USB card is ready.

Figure 8:
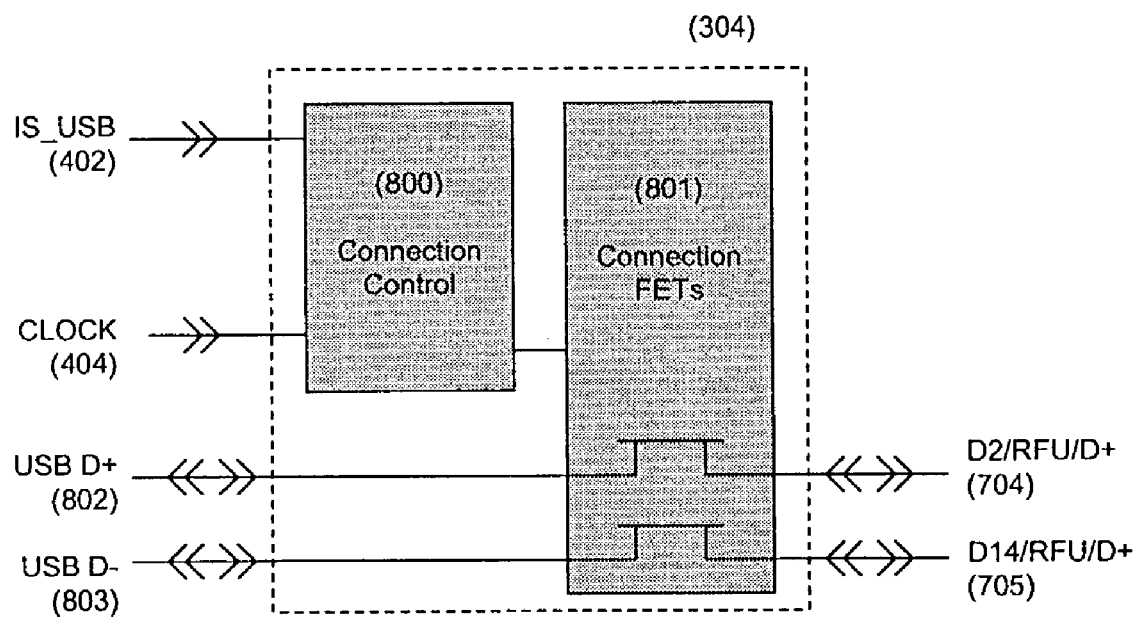
FIG. 8 illustrates the enhanced power switch connection block circuitry of the present invention.

FIG. 8 depicts the connection circuit block (304) of the present invention. The connection block circuit (304) generally includes the function of electrically connecting the computer system's USB signals, USB D+ (802) and USB D− (803), to the PC Card socket when the modular USB PC Card is inserted.

A field effect transistor (FET) switch connection circuit (801) may be added to the connection circuit block (304), and the connection is enabled when the connection state is determined by the connection control circuitry (800). In this embodiment, the connection state is determined by the circuitry (800) when the IS_USB signal (402) has been asserted for a time period greater than 2.5 ms, of course this time period is also only exemplary and may be generally be defined as a state when the USB card is ready.

Figure 9:
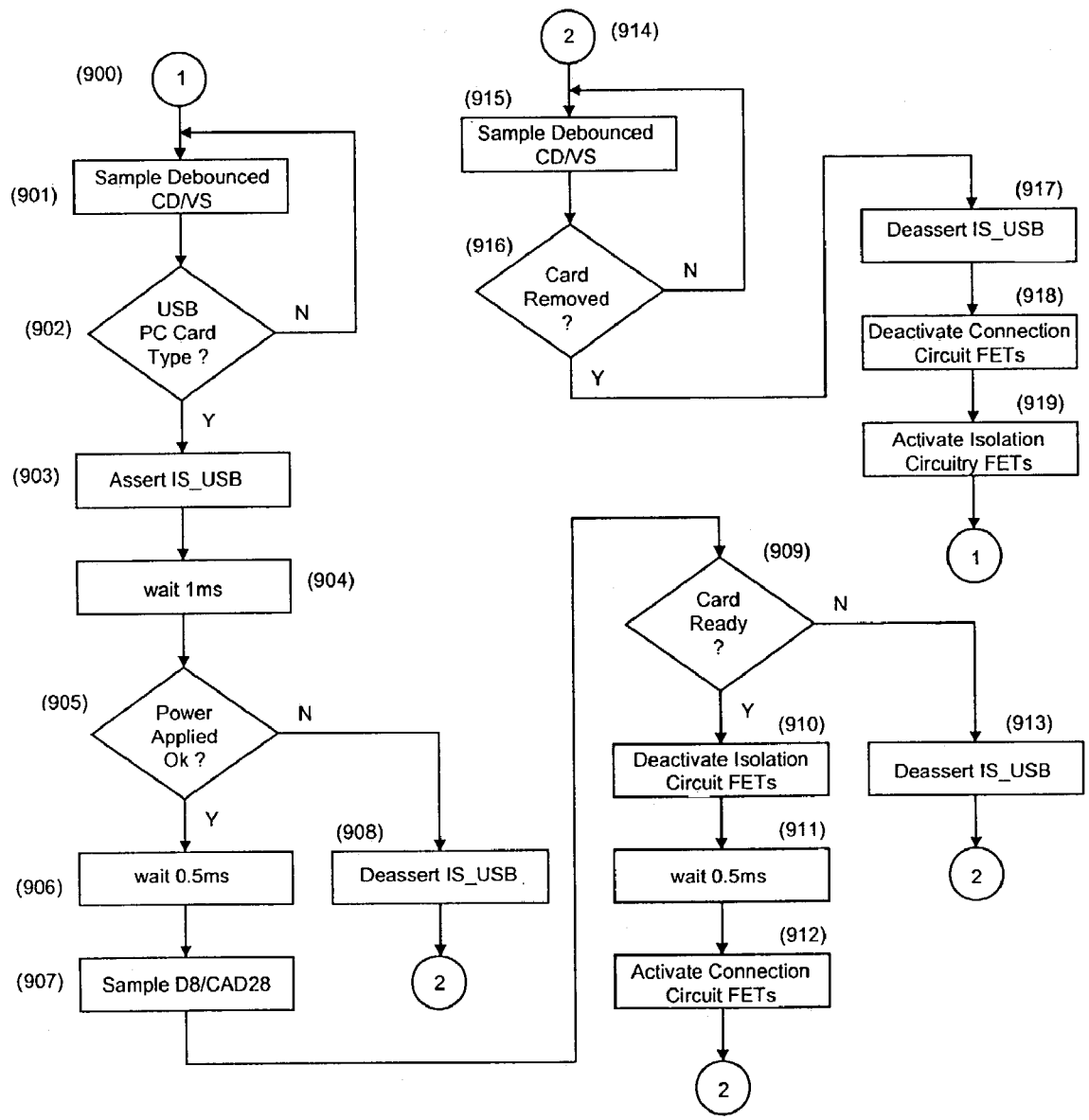
FIG. 9 illustrates an exemplary logical flow diagram of the operation of the enhanced power switch of the present invention.

FIG. 9 illustrates a logical flow diagram of the enhanced power switch of the present invention. Upon power up and reset, the flow begins at a known state that awaits card insertion; that is, state 1 (900). In state 1, the connection circuitry FETs are deactivated, isolation circuitry FETs are activated, and the IS_USB signal (402) is deasserted. An activated FET is a closed switch (i.e. connected), and a deactivated FET is an open switch (i.e. isolated). The enhanced power switch samples (901) the debounced card detects and voltage sense inputs (107), and determines the type of PC Card inserted (902). If a modular USB PC Card type is not inserted, the enhanced power switch remains in state 1 (900). If a modular USB PC Card type is inserted, the enhanced power switch asserts (903) the IS_USB signal. After a 1 ms delay (904), the enhanced power switch determines if the power was successfully applied (905). If not, then the IS_USB signal is deasserted (908) and the enhanced power switch transitions to a state that awaits card removal; that is, state 2 (914). If the power is successfully applied, then after a 0.5 ms wait delay (906), the optional sense signal(s) (403) (or the D8/CAD28 signal (405)) are sampled (907). This sample is used to determine if the card is ready (909) to connect to the computer system's USB interface. If not, then the IS_USB signal is deasserted (913), which causes power to be removed from the USB PC Card, and a transition is made to a state that awaits card removal; that is, state 2 (914). If the card is determined (909) to be ready, then the isolation circuitry FETs are deactivated (910), a 0.5 ms delay occurs (911) to ensure complete isolation by the open isolation FET switches, and the connection circuitry FETs are activated (912). After the connection is made between the USB signals on the modular PC Card and the USB signals on the computer system by activating the connection circuitry FETs (912), the enhanced power switch transitions to a state that awaits card removal; that is, state 2 (914).

While awaiting card removal, beginning at state 2 (914), the CD/VS signals are sampled (915) until it is determined (916) that the USB PC Card has been removed. When removed, the enhanced power switch deasserts (917) the IS_USB signal, deactivates the connection circuit FETs (918), activates the isolation circuit FETs, and transitions to a state that awaits card insertion; that is, state 1 (900).

Figure 10:
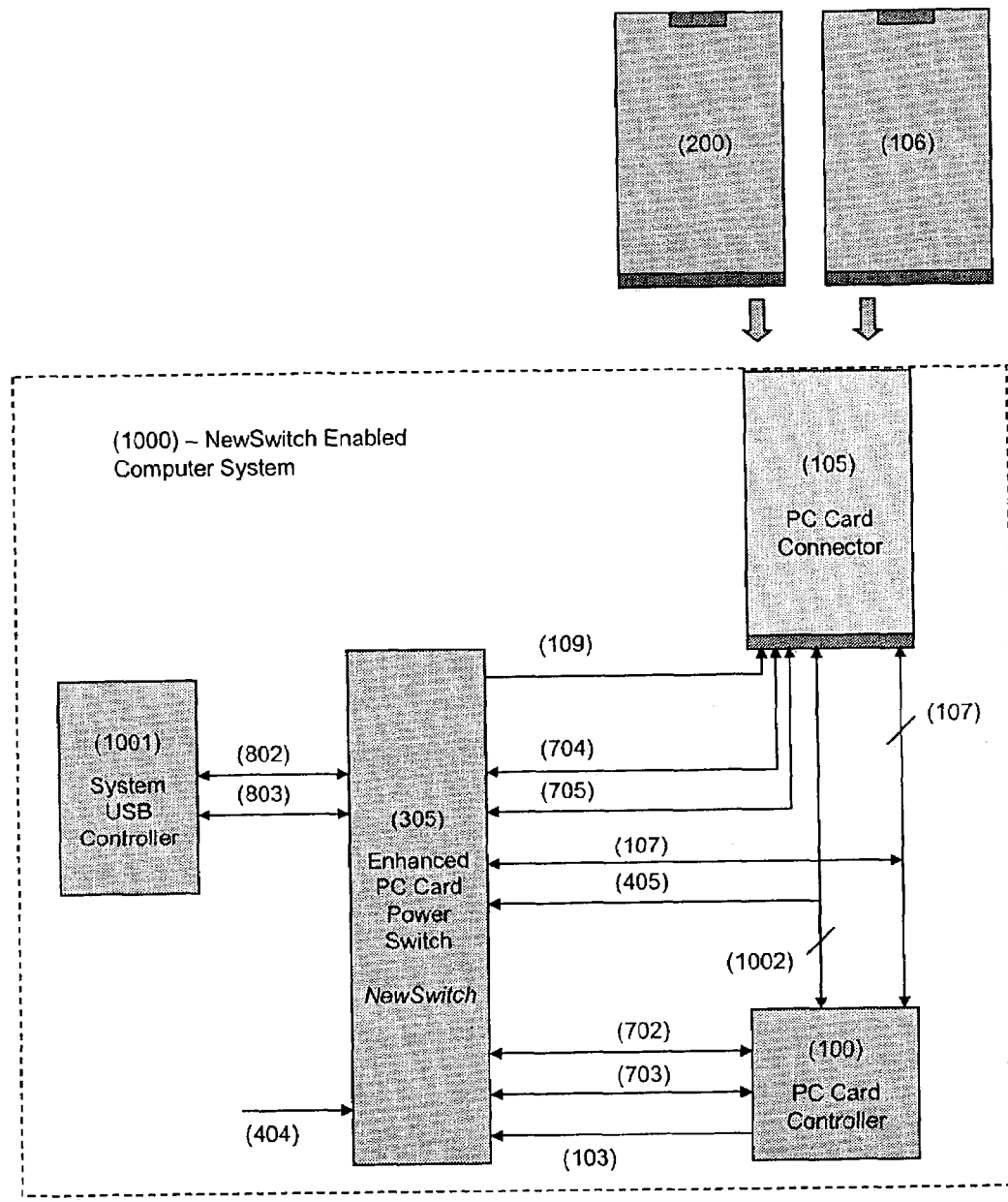
FIG. 10 illustrates a computer system's PC Card subsystem with the enhanced power switch of the present invention to support modular USB PC Cards.

FIG. 10 illustrates a computer system (1000) with PC Card subsystem enhancements using the enhanced power switch technology of the present invention to support modular USB PC Cards (200) in addition to conventional PC Cards (106). The PC Card subsystem enhancements are made with no change to the PC Card connector (105), the PC Card controller (100), or the control signals (103) from the PC Card controller to the power switch (305). The enhanced PC Card power switch (305) retains the prior-art function of supplying VCC/NVPP power sources (109) to the card.

The CD/VS signals (107) are connected to the enhanced PC Card power switch (305) to determine the presence of a modular USB PC Card (200). When a modular USB PC Card is not present in the PC Card socket, the D2/RFU (702) and D14/RFU (703) signals from the PC Card controller are connected to the PC Card electrical interface signals D2/RFU/D+ (704) and D14/RFU/D− (705) via FET switches in the enhanced power switch device (305). The connections between the PC Card socket and the PC Card controller (1002) remain unchanged from prior-art connections (108), with the exception of the D2/RFU (702) and D14/RFU (703) signals that pass through the power switch (305).

When a modular USB PC Card (200) is present in the PC Card socket, and is ready for use by the indication given on the D8/CAD28 signal (405), the connections between the PC Card controller (100) and the socket for the D2/RFU (702) and D14/RFU (703) signals are isolated by deactivating FET switches in the enhanced power switch (305). An electrical connection is made between the D2/RFU/D+ (704) and D14/RFU/D− (705) and the computer system's USB signals D+ (802) and D− (803) via FET switches in the enhanced power switch device (305). This electrical connection allows USB protocols to operate between the system's USB controller (1001) and the modular USB PC Card (200). Logic elements including timers in the enhanced power switch (305) may be utilize an external clock source (404).

Card sensing may be placed in the PC Card controller to detect a modular USB PC Card (one approach may be to use that learned from U.S. Pat. No. 6,470,284), and the PC Card controller may be enhanced to include isolation circuitry and connection circuitry to support a modular USB PC Card. The PC Card controller may also be enhanced to control the power to the modular USB PC Card. However, there is a big disadvantage to this approach—large development costs.

There are a variety of PC Card controllers on the market today, with many variations. For example, there are single socket PC Card controllers, dual socket PC Card controllers, those with integrated Smart Card technology and advanced card sensing as learned in U.S. Pat. No. 6,470,284, controllers with integrated flash media readers, controllers with integrated IEE1394a OHCI controllers, etc. If a PC Card controller manufacturer was to enable an entire product line to support the modular USB PC Cards, this could cost millions of dollars in engineering costs since there are so many controller variations.

The enhanced power switch approach of the present invention is advantageous because one or two variations (i.e. new designs) may accommodate all of the PC Card controller variations. Another advantage of the enhanced power switch approach is that the primary reason that PC Card power switches are not integrated into PC Card controllers today is that of process technology. The target technology for PC Card controllers is best for high density, million transistor designs, with emphasis also on small input/output buffer designs. The wafer costs for these processes can be very high. The target technology for PC Card power switches is more to accommodate the large silicon area required to meet the low-impedance FET switch design characteristics. This goal is commensurate with the FET switch requirements of the connection circuitry for enhanced power switch of the present invention.

ALTERNATE EMBODIMENTS

Numerous modifications may be made to the present invention. For example, the exemplary embodiment of the enhanced power switch of the present invention is directed to the advancements in USB bus interface technology. However, the enhanced power switch circuitry described herein may also be adapted to detect IEEE1394, PCI-Express, InfiniBand, Secure Digital Input/Output SDIO cards, and other bus interface technology.

The exemplary embodiment of the enhanced power switch of the present invention connection circuitry (304) utilizes FET switches (801) to connect the USB electrical signals D+ and D− to the PC Card with minimal impedance and delay. An alternate embodiment may integrate USB hub technology, as described in the USB Specifications (incorporated herein by reference), into the PC Card power switch. An alternate embodiment may integrate a USB host controller, as described in the USB Specifications, into the PC Card power switch.

The exemplary embodiment of the enhanced power switch of the present invention map the USB electrical signals D+ and D− to the existing PC Card signals D2/RFU (socket pin 32) and D14/RFU (socket pin 40), respectively. Alternate embodiments may map these USB signals to other socket pins, for example, the PC Card Standard Version 8.0 identifies IORD#/CAD13 (socket pin 44) and IOWR#/CAD15 (socket pin 45) for D+ and D−, respectively.

With reference to FIG. 4, instead of using the CD/VS signals (107) and/or other signals (403) to detect the card, the exemplary embodiment of the enhanced power switch of the present invention may instead (or additionally) utilize the D8/CAD28 signal (405) to determine if the USB PC Card is ready to be used for USB signaling. This component of the sensing circuit may be alternately removed (e.g. by assuming that the USB PC Card is always ready), or an alternate signal (e.g. D9/CAD3) may be used for this purpose.

The exemplary embodiment of the enhanced power switch implementation is to include one PC Card controller device and one separate PC Card power switch device. An alternate embodiment may integrate the PC Card controller and the PC Card power switch with enhanced power switch circuitry into a multi-chip module, where two dies are manufactured in a single package. The "die" is the silicon component of a chip (i.e. the die plus the package are a chip).

The exemplary embodiment of the enhanced power switch Card Sense block uses an external clock source for the debounce and type selector circuit. An alternate embodiment may use an internally generated clock source, to save a system terminal connection.

The exemplary embodiment of the enhanced power switch Card Power Switching Circuit uses an external clock source to generate the PWR_GOOD signal. An alternate embodiment may use an external or internal sample of the power supplied to the PC Card socket to determine when the power is at a good level for usage.

The exemplary embodiment of the enhanced power switch card sense block involves detecting the type of PC Card inserted by sampling card detect and voltage sense signals. An alternate embodiment may involve sampling other signals that indicate the presence of the modular USB PC Card, for example, a signal from an enhanced PC Card connector that indicates the USB PC Card is inserted by a physical switching mechanism related to the keying or other physical characteristics of the USB PC Card.

The isolation circuit (303) may be removed. If so, the PC Card controller (100) may be modified to use the CD/VS signals (107) to determine that a USB card is present and further modified to electrically isolate itself from the USB signals (704) and (705).

These and other modifications will be understood by those skilled in the art, and numerous other modifications may be made to the present invention without departing from the spirit and scope of the invention herein defined.

We claim:

1. A PC Card power switch for operating a plurality of PC Cards comprising: card sense circuitry configured to detect a first PC Card type and a second PC Card type using preselected PC Card signals and for generating a new signal that has a first state when said first PC Card type is present and a second state when said second PC Card is present, and an isolation circuit configured to receive said new signal and isolate said second PC Card type from a PC Card controller if said new signal has said second state, and to couple said first PC card type to said PC Card controller if said new signal has said first state.

2. A power switch as claimed in claim 1, further comprising card power switching circuitry configured to receive said new signal and couple said second PC Card to a power supply when said new signal has said second state.

3. A power switch as claimed in claim 1, further comprising a connection circuit configured to connect bus signal lines to said second PC Card when said new signal is active.

4. A PC Card power switch for operating modular USB PC Cards comprising card sense circuitry adapted to detect the type of PC Card using preselected PC Card signals and for generating a new signal that has a first state when said modular USB PC Card is present; and an isolation circuit configured to receive said new signal and to isolate said modular USB PC Card from selected PC Card control signals from a PC Card controller when said new signal has a second state indicating the presence of a second PC Card type, said isolation circuit further configured to couple said modular USB PC Card to said PC Card controller if said new signal has said first state.

5. A power switch as claimed in claim 4, further comprising card power switching circuitry adapted to receive said new signal and couple said modular USB PC card to a power supply.

6. A power switch as claimed in claim 4, further comprising a connection circuit adapted to connect USB bus signal lines to said modular USB PC Card when said new signal indicates the presence of an modular USB PC Card.

7. A PC Card controller system for controlling a plurality PC Card types, comprising: a PC Card controller configured to generate PC Card signals corresponding to a first PC Card type and control PC Cards of said first PC Card type; and a power switch device configured to determine if a second PC Card type is present, said PC Card controller system comprising card sense circuitry configured to detect the type of PC Card using preselected PC Card signals and for generating a new signal that is active when an said second PC Card type is present, said PC Card controller system further comprising an isolation circuit configured to receive said new signal and isolate said second PC Card type from said PC Card controller if said new signal has said second state, and to couple said first PC card type to said PC Card controller if said new signal has said first state.

8. A system as claimed in claim 7, wherein said power switch is further configured to couple power and bus signals to said second PC Card type if said generated new signal is active.

9. A system as claimed in claim 7, wherein said power switch is also configured to isolate said PC Card signals corresponding to said first PC Card type from said second PC Card type when said second PC Card type is present.

10. A PC Card power switch according to claim 1, wherein said first PC Card type includes CardBus or PCMCIA cards and said second PC Card type includes USB cards.

11. A power switch as claimed in claim 1, wherein said PC Card controller is a controller operable to detect and operate one or more of CardBus or PCMCIA type cards.

12. A power switch as claimed in claim 4, wherein said second PC Card type comprises one of CardBus or PCMCIA type cards.

* * * * *

UNITED STATES PATENT AND TRADEMARK OFFICE
CERTIFICATE OF CORRECTION

| | |
|---|---|
| PATENT NO. | : 7,365,454 B2 |
| APPLICATION NO. | : 10/420262 |
| DATED | : April 29, 2008 |
| INVENTOR(S) | : Morrow |

Page 1 of 1

It is certified that error appears in the above-identified patent and that said Letters Patent is hereby corrected as shown below:

In column 10, line 35, in Claim 8, after "said" delete "generated".

Signed and Sealed this

Twenty-third Day of September, 2008

JON W. DUDAS
*Director of the United States Patent and Trademark Office*